United States Patent
Gribble

(10) Patent No.: US 11,619,521 B2
(45) Date of Patent: Apr. 4, 2023

(54) POSITION MEASUREMENT ENCODER AND METHOD OF OPERATION

(71) Applicant: RENISHAW PLC, Wotton-Under-Edge (GB)

(72) Inventor: Andrew Paul Gribble, Bristol (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 17/211,983

(22) Filed: Mar. 25, 2021

(65) Prior Publication Data

US 2021/0278254 A1 Sep. 9, 2021

Related U.S. Application Data

(63) Continuation of application No. 13/321,859, filed as application No. PCT/GB2010/001106 on Jun. 4, 2010, now Pat. No. 10,989,567.

(30) Foreign Application Priority Data

Jun. 5, 2009 (GB) .................................. 0909724.7

(51) Int. Cl.
*G01D 5/244* (2006.01)
*G01D 5/347* (2006.01)
*G01D 5/245* (2006.01)

(52) U.S. Cl.
CPC ....... *G01D 5/24461* (2013.01); *G01D 5/2455* (2013.01); *G01D 5/34715* (2013.01); *G01D 5/34792* (2013.01)

(58) Field of Classification Search
CPC ............. G01D 5/34792; G01D 5/2455; G01D 5/34715; G01D 5/24461
See application file for complete search history.

(56) References Cited

U.S. PATENT DOCUMENTS

| 4,529,964 | A | * | 7/1985 | Minami | ............. G01D 5/24409 |
| | | | | | 250/237 G |
| 5,299,143 | A | | 3/1994 | Hellinga et al. | |
| 5,438,330 | A | | 8/1995 | Yamazaki et al. | |

(Continued)

FOREIGN PATENT DOCUMENTS

| CN | 1727850 A | 2/2006 |
| CN | 101059356 B | 12/2010 |

(Continued)

OTHER PUBLICATIONS

Mar. 12, 2015 Office Action issued in Chinese Application No. 201080024938.7.

(Continued)

*Primary Examiner* — Yoshihisa Ishizuka
(74) *Attorney, Agent, or Firm* — Oliff PLC

(57) ABSTRACT

A method of operating a position encoder apparatus, including a scale having features defining position information and a readhead for reading the scale. The method includes: calculating extrapolated position information from at least one previous reading of the scale; comparing an extrapolated position with a position calculated from a reading of the scale to determine any discrepancy between them; using the extrapolated position information whether or not there is a discrepancy; and maintaining a record of any discrepancies.

15 Claims, 10 Drawing Sheets

(56) References Cited

U.S. PATENT DOCUMENTS

| | | | |
|---|---|---|---|
| 6,191,550 B1 | 2/2001 | Yoshihara | |
| 6,366,047 B1* | 4/2002 | Horwitz | G01D 5/2497 318/567 |
| 6,556,153 B1 | 4/2003 | Cardamone | |
| 7,309,855 B2 | 12/2007 | Nagasaka et al. | |
| 7,317,183 B2 | 1/2008 | Wong et al. | |
| 7,647,208 B2 | 1/2010 | Kulczyk et al. | |
| 10,502,593 B1* | 12/2019 | Johnson | G01D 5/34792 |
| 2003/0020642 A1 | 1/2003 | Ely et al. | |
| 2004/0094338 A1 | 5/2004 | Skurnik | |
| 2004/0118758 A1 | 6/2004 | Gordon-Ingram | |
| 2005/0133705 A1* | 6/2005 | Hare | G01D 5/2458 250/231.13 |
| 2005/0288907 A1 | 12/2005 | Kulczyk et al. | |
| 2006/0050989 A1 | 3/2006 | Shepherd et al. | |
| 2007/0256313 A1 | 11/2007 | McAdam | |

FOREIGN PATENT DOCUMENTS

| | | | |
|---|---|---|---|
| DE | 44 36 784 B4 | 8/2005 | |
| DE | 10 2006 011 540 A1 | 8/2007 | |
| DE | 10 2006 059 258 A1 | 6/2008 | |
| EP | 1 635 073 A2 | 3/2006 | |
| EP | 2 073 372 A1 | 6/2009 | |
| JP | H05-223597 A | 8/1993 | |
| JP | H05-312591 A | 11/1993 | |
| JP | 2000-74694 A | 3/2000 | |
| JP | 2002-521684 A | 7/2002 | |
| JP | 2005-207864 A | 8/2005 | |
| JP | 2005-227287 A | 8/2005 | |
| JP | 2006-226987 A | 8/2006 | |
| WO | 00/06973 A1 | 2/2000 | |
| WO | WO-0006973 A1* | 2/2000 | G01D 5/2454 |
| WO | 02/084223 A1 | 10/2002 | |
| WO | 03/058172 A2 | 7/2003 | |
| WO | 2004/094957 A1 | 11/2004 | |

OTHER PUBLICATIONS

Jun. 16, 2015 Japanese Office Action issued in Japanese Application No. 2014-169743.
Jul. 30, 2016 Office Action issued in Korean Patent Application No. 10-2011-7031514.
Mar. 31, 2017 Office Action issued in Korean Patent Application No. 10-2011-7031514.
Jul. 20, 2017 Examination Report issued in Indian Patent Application No. 9528/DELNP/2011.
Apr. 8, 2019 Extended Search Report issued in European Patent Application No. 18206036.8.
Vogt Peter, DE-4436784-B4, Machine Translation (Year: 2005).
International Search Report date Aug. 5, 2011 in International Application No. PCT/GB2010/001106.
Written Opinion of the International Searching Authority dated Aug. 5, 2011 in International Application No. PCT/GB2010/001106.
British Search Report dated Oct. 14, 2009 in British Application No. 0909724.7.
Office Action issued in Chinese Application No. 201080024938.7 dated Sep. 27, 2013 (with translation).
Office Action issued in Japanese Application No. 2012-513676 dated Oct. 1, 2013 (with translation).
Office Action issued in Japanese Application No. 2012-513676 dated Apr. 22, 2014 (with translation).
Office Action issued in Chinese Application No. 201080024938.7 dated Jul. 8, 2014 (with translation).
Jan. 6, 2021 Notice of Allowance issued in U.S. Appl. No. 13/321,859.

* cited by examiner

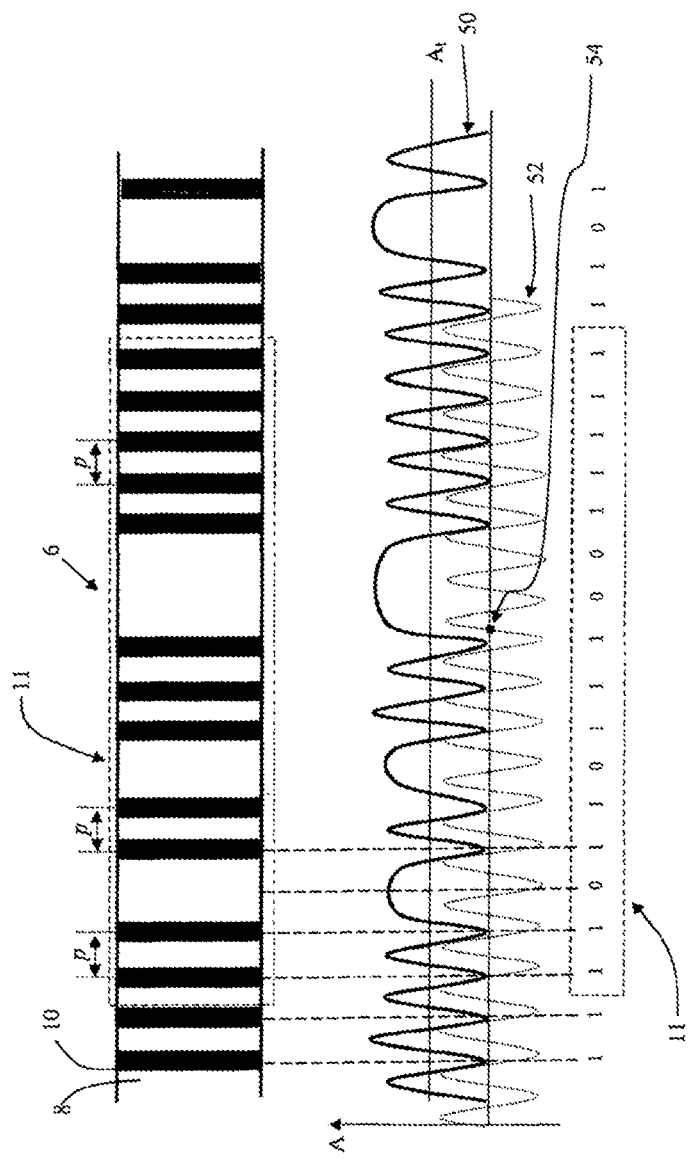

POSITION MEASUREMENT ENCODER AND METHOD OF OPERATION

This application is a Continuation of application Ser. No. 13/321,859 (now U.S. Pat. No. 10,989,567), filed Nov. 22, 2011, which is a national stage of PCT/GB2010/001106, filed Jun. 4, 2010, which claims priority to GB 0909724.7, filed Jun. 5, 2009. The entire contents of the prior applications are hereby incorporated by reference herein in their entirety.

This invention relates to a position measurement encoder and in particular to a device for measuring the relative position between two objects. The invention also relates to a method of operation of such a position measurement encoder.

A position encoder is an apparatus for measuring the relative position of two objects. Typically a scale is attached to or formed on one of the objects and a scale reader to the other. The scale can have regularly spaced features (especially in the case of an incremental scale) defining a measurement length, i.e. the degree of freedom in which the scale facilitates measurement. Two dimensional position encoders are also known which have markings which define two usually orthogonal measurement lengths.

A scale might be a linear scale for providing measurement of linear movement between the two objects. Alternatively, a scale might be a rotary scale for providing measurement of angular movement between the two objects. In known optical embodiments a scale reader projects light onto the scale which, depending on the configuration of the scale, is then either reflected or transmitted. The reflected or transmitted light falls on the scale reader which then generates an incremental count indicative of the relative displacement of the two objects as the scale and scale reader move relative to each other in the measurement dimension. In particular, as will be understood by a person skilled in the art, the scale reader generates a phase reading specifying where the scale reader is relative to the scale as a subdivision of the scale period and this phase data is continuously fed into a counter which keeps track of the relative displacement. As will be understood, what the scale period is taken to be can vary between different encoder systems but as will be understood typically it can be the distance between the centres of adjacent common features which are used to determine phase information. For example, in an incremental system it can be the distance between the centres of two reflective lines or two non-reflective lines in a reflective optical encoder. The count can be referenced from either end of a scale or predetermined positions along the scale identified by markers either embedded within the scale or on a track next to the scale.

Absolute position encoders are also known which enable the absolute position of the readhead relative to a scale to be determined without the need to count from a predetermined position. Such encoders typically comprise a scale with unique position data formed on it along the measuring length of the scale. The data can be in the form of, for instance, a pseudorandom sequence or discrete codewords. By reading this data as the scale reader passes over the scale the scale reader can determine its absolute position.

Encoder scales can be read by taking and processing discrete snapshots of the scale instead of continuously measuring and counting phase. The snapshot could be taken in one reading at one instant in time, or could be built up by taking a quick succession of smaller readings. Snapshot reading of a scale can provide a number of advantages. For instance, the maximum operating velocity of the scale reader relative to the scale can be greater as it is not limited by the inherent frequency limits of the continuous phase measuring and counting system. Further, in optical systems taking snapshots, the light source only has to be on for a short amount of time which allows the light intensity to be increased relative to a continuous system without increasing the average power consumption or limiting the life time of the source. This increased light intensity can mean that more photons can be captured by the sensor thus reducing the noise floor of the system giving less position noise.

Capturing and processing a snapshot reading of a scale can comprise determining at least a coarse position. This can be a measure of the relative position of the scale and readhead to a resolution of one or more scale periods. It can also comprise a plurality of stages including, for example, determining a fine position. This can be a measure of the relative position of the scale and readhead to a resolution finer than the coarse position. For instance, it could be a measure of the relative position of the scale and readhead to a resolution finer than one scale period. This could be done via, for instance, phase extraction. The process could also comprise measuring the scale period, i.e. the fundamental frequency, or the scale period, of the scale's features. All these steps have a chance of failing and could result in a position that is significantly different from the actual position. Also, other external factors such as dirt on the scale could adversely affect a position reading. In a typical control application where the scale reader is used for position feedback, position data can be required at a rate of around 16 kHz. This equates to around $1.4 \times 10^9$ readings in every 24 hour period. In this scenario even at very low error rates it can be seen that incorrect readings can occur. It is common for machine controllers to take precautions such as shutting the machine down if a single incorrect reading is obtained from a scale reader.

The present invention provides a position encoder which provides position information having improved reliability.

In particular, the invention provides a method of operating an encoder apparatus, comprising a scale having features defining position information and a readhead for reading the scale, the method comprising: calculating extrapolated position information from at least one previous reading of the scale. The extrapolated position information can then be subsequently used. In particular, the extrapolated position information can be used instead of, or in addition to, an actual reading of the scale.

According to a first aspect of the invention there is provided a method of operating an encoder apparatus, comprising a scale having features defining position information and a readhead for reading the scale, the method comprising in any suitable order: calculating extrapolated position information for subsequent use from at least one previous reading of the scale. The extrapolated position can be compared with a position calculated from a reading of the scale to determine any discrepancy between them. The extrapolated position information can subsequently then be used (e.g. by a downstream process which requires position information) whether or not there is a discrepancy. A record of discrepancies can be maintained.

It is an advantage of the present invention that any spurious readings of the scale will not cause the encoder apparatus to output incorrect position information. It has been found that extrapolation is less likely to provide an incorrect position reading than a reading of the scale and if extrapolation does fail then the extrapolated position generally only deviates slowly from the correct position. Accordingly, in the case of any discrepancy, it is assumed that the extrapolated position information is correct and that the reading was wrong. Nevertheless, a record of the discrepancy is made which can be used subsequently such that suitable recording and/or monitoring of the discrepancies can take place.

Optionally, the readhead can be configured to read the scale by obtaining discrete snapshots of the scale. This can be instead of, for instance, continuously measuring and counting phase. Accordingly, a reading of the scale can be obtained by the readhead taking a discrete snapshot of the scale. The snapshot could be taken at one instant in time, or be built up by taking a quick succession of smaller readings of consecutive sections of the scale.

The scale's features could define incremental position information only. In this case the scale's features could comprise a plurality of regularly spaced features. Optionally, at least one reference mark can be provided adjacent to or embedded within the series of incremental features for defining at least one reference position.

Preferably, the scale features define a series of unique absolute positions. The series of unique absolute positions can be defined by features in a plurality of tracks, for example a plurality of adjacent tracks. Optionally, the series of unique absolute position can be defined by features contained in a single track only. For example, the absolute position information can be determined from the combination of features taken along the measuring length of the scale.

The fine position information can be determined from features contained in the same track as features defining the series of unique absolute positions. In particular, fine position information can be determined from the features defining the series of unique absolute positions. Accordingly, the coarse position part and fine position part of the position information can be determined from a common series of position features. Such scales could be referred to as a single track scale. Optionally, the scale could comprise at least a first track having features defining a series of unique absolute positions and at least a second track defining incremental information only. In this case, the coarse position part could be determined from the at least one first track and any fine position information could be determined from the at least one second track.

As explained above, what the scale period is can vary from system to system. Nevertheless, as will be understood, typically the scale period will be the distance between the centres of the features used for determining the fine, e.g. phase, position information. Due to the regular spacing of features, the scale period can be determined on an incremental scale by determining the distance between the centres of adjacent common features as described above. In general, the scale period can normally be found by determining the spacing between the centres of the two closest common features (e.g. the distance between the centres of the closest two reflective lines, or the distance between the centres of the closest two non-reflective lines, in a reflective optical encoder apparatus). This can be true for absolute scales, in particular absolute scales in which the absolute position information is embedded by altering an otherwise periodic incremental scale, e.g. so as miss some features out.

The method can further comprise monitoring the record for discrepancies indicative of a failure of the extrapolated position calculation. Failure of the extrapolated position calculation can lead to incorrect extrapolated positions being calculated. Such monitoring can comprise monitoring the number of discrepancies. Such monitoring can comprise monitoring for excessive discrepancies. For example, excessive discrepancies can comprise an excessive number of discrepancies. For instance, this can comprise monitoring for at least two discrepancies, more preferably at least three discrepancies, especially preferably at least four discrepancies. Excessive discrepancies can comprise a plurality of discrepancies within a predetermined time limit. Excessive discrepancies can comprise a plurality of consecutive discrepancies. Optionally, excessive discrepancies can comprise a plurality of discrepancies over a predetermined distance.

Monitoring the record for discrepancies indicative of a failure of the extrapolated position calculation can comprise monitoring the magnitude of the discrepancy. This is useful as the magnitude of the discrepancy for an extrapolation failure is likely to be different to that for a failure of the scale reading. For example if extrapolation fails due to excessive acceleration then the position discrepancy will likely only be a small number of scale periods. An extrapolation failure could therefore be determined if the magnitude of the discrepancy is less than a predetermined threshold. This threshold could be a value corresponding to a number of scale periods. The threshold could be 10 scale periods, more preferably scale periods, especially preferably only 1 scale period.

Furthermore, if extrapolation fails due to excessive acceleration then the position discrepancy will likely only be a small number of scale periods and will likely steadily increase with each subsequent scale reading. Accordingly, monitoring the record for discrepancies indicative of a failure of the extrapolated position calculation could comprise checking whether the magnitude of the discrepancy increases over a plurality of scale readings.

A failure of the scale reading will likely give a much greater discrepancy, the size of which is dependent on how the position information is encoded on the scale (the scale's "coding scheme"). In particular, with regard to absolute encoders in which absolute position information is encoded in the form of discrete codewords, a failure of the scale reading may result in an error having a multiple of the size of the codeword. If for example discrete 16-bit codewords are used (with one bit per scale period) then any error in reading the scale may be a multiple of 16 scale periods. Accordingly, monitoring the record for discrepancies indicative of a failure of the extrapolated position calculation could comprise checking whether the discrepancy is a number of scale periods equal to a multiple of the codeword size.

Furthermore, coding schemes can be designed so that likely scale reading errors will give errors of a certain magnitude. For example, when using discrete codewords, similar codewords can be placed far apart on the scale with dissimilar codewords being placed adjacent to one another. For instance, similar codewords could be placed at least two whole codewords apart from each other, more preferably at least three whole codewords apart, especially preferably at least five whole codewords apart. What are considered to be "similar codewords" can depend on the coding scheme and in particular the length of codewords used. In a particular example, similar codewords could be those codewords which have no more than three bits that are different to each other. Accordingly, if three bits of a codeword were read incorrectly (for instance due to the presence of dirt on the scale), then the position according to the reading will be incorrect by a large distance (for instance, by at least two or more whole codeword lengths). Provided the relative acceleration between the readhead and scale does not exceed a predetermined maximum relative acceleration, it is unlikely that such a discrepancy is due to extrapolation failure and so it can be assumed that the discrepancy is due to a reading error.

Accordingly, in such circumstances, a failure of the extrapolated position calculation can again be determined when the discrepancy is less than a predetermined magnitude. In other examples, similar codewords could be those codewords having no more than two bits different to each other, for example no more than one bit different to each other.

Calculating extrapolated position information from at least one previous reading of the scale can comprise calculating a current position from a previous reading and the time elapsed since the previous reading. This can involve using knowledge about the relative velocity of the scale and readhead. Relative velocity information could be provided by an external device. The relative velocity could be determined from at least two previous readings. The at least one previous reading could be an at least partly extrapolated reading, or a reading of the scale.

Comparing can comprise comparing a coarse extrapolated position with coarse position information read from the scale. In particular, comparing can comprise comparing a coarse absolute extrapolated position with coarse position information read from the scale.

Calculating extrapolated position information can comprise using i) coarse position extrapolated from at least one previously determined absolute position and ii) fine position information calculated from a current reading of the scale. As will be understood, fine position information will have a finer degree of resolution than coarse position information. In particular, calculating extrapolated position information can comprise using i) absolute position extrapolated from at least one previously determined absolute position and ii) fine position information calculated from a current reading of the scale.

Furthermore, this can comprise combining the extrapolated position (e.g. an extrapolated absolute position) with the fine position information. In particular, this can comprise combining a coarse position (e.g. coarse absolute position) extrapolated from at least one previously determined absolute position with fine position information calculated from a current reading, or snapshot, of the scale. The fine position could be a phase reading. As explained above, a phase reading can specify where the reader is relative to the scale as a subdivision of the scale period. In particular, the fine position could comprise the position of the features as detected by the readhead's sensor relative to a predetermined point on the sensor. This can be determined by looking at the phase offset between the signal output by the readhead's sensor and a predetermined reference signal.

As will be understood, the coarse absolute position can be calculated whether the scale is an absolute scale (i.e. the scale features define a series of unique absolute positions) or an incremental scale having at least one reference mark. As will be understood, with an incremental scale having at least one reference mark an absolute position can be determined by keeping a count of the distance from the reference mark. Accordingly, the steps of calculating extrapolated position information using i) coarse absolute position extrapolated from at least one previously determined absolute position and ii) fine position information calculated from a current reading of the scale, isn't limited to absolute scales only.

The method can further comprise performing an error routine in the event of discrepancies indicative of a failure of the extrapolated position. Performing an error routine can comprise issuing an error signal. The error routine can comprise resetting variables used in calculating extrapolated position information. For instance, it could comprise recalculating the at least one previous reading. It could comprise recalculating the relative velocity between the scale and readhead.

The step of using i) absolute position extrapolated from at least one previously determined absolute position and ii) fine position information calculated from a current snapshot of the scale can comprise comparing a coarse extrapolated position with coarse position information read from the scale. Accordingly, in embodiments in which the position can be resolved into a coarse position part (i.e. a position to the nearest whole period of the scale features) and a fine position part (i.e. the part of the position having a resolution finer than the period of the scale features), the method can comprise comparing only the coarse position part of the position information.

Using the extrapolated position can comprise sending, or supplying, the extrapolated position to an external device. Using the extrapolated position can comprise storing the extrapolated position for subsequent use. In particular, it could be stored for use in a subsequent extrapolation calculation. The extrapolated position could be used in the determination of the position of at least part of a machine, such as a coordinate positioning machine, and furthermore could be used in the control, for instance the real-time control, of a machine.

As will be understood, not every extrapolated position calculated need be compared with a reading of the scale. Likewise, not every reading of the scale needs to be compared with an extrapolated position. However, preferably, the comparison of an extrapolated position with an actual position reading occurs at intervals, in particular at frequent intervals. As will be understood, this can vary depending on the particular requirements of the system in which the invention is used. The intervals could be regular or irregular. Comparisons could occur only on the request of an external device and hence the interval between successive comparisons could be out of the control of the encoder apparatus. Preferably, the intervals are regular. Preferably the intervals are dictated by the encoder apparatus, and in particular by the readhead. Preferably, at least every other extrapolated position is compared with a position calculated from a reading of the scale. More preferably each extrapolated position is compared with a position calculated from a reading of the scale to determine any discrepancy between them. Nevertheless, it can be seen that the method of the invention can be used in embodiments in which extrapolated positions are used in place of actual readings of the scale (e.g. the readhead or other device processing the readhead's output to get position information provides extrapolated position information) and in which at least some of (and preferably frequent samples of) the extrapolated positions are compared with an actual readings of the scale in order to check that the extrapolated position information doesn't deviate too much from the actual relative position over time (e.g. by a predetermined threshold which could for instance be magnitude of deviation based and/or frequency of deviation based). In particular, it can be used in embodiments in which a succession of extrapolated positions are calculated/ used, and in which only some of the extrapolated positions are compared with a position calculated from a reading of the scale.

The position encoder apparatus can be a magnetic or inductive position encoder apparatus. The position encoder apparatus can be a capacitive position encoder apparatus. Optionally, the position encoder apparatus is an optical position encoder apparatus. In this case, the position encoder apparatus could be transmissive in which the readhead detects light transmitted through the scale. Optionally, the position encoder apparatus could be reflective in which the readhead detects light reflected off the scale. The readhead could comprise an optical source for illuminating the scale.

As will be understood, there are many suitable ways in which the features can be defined on a scale. For instance, features can be defined by markings having particular electromagnetic radiation (EMR) properties, for example particular optical properties, for instance by the particular optical transmissivity or reflectivity of parts of the scale. Accordingly, a feature could for example be defined by parts of the scale having a minimum reflectivity or transmissivity value. Optionally, a feature could for example be defined by parts of the scale having a maximum reflectivity or transmissivity value. In the case of a magnetic encoder, features can be defined by markings having particular magnetic properties or for instance by the presence or absence of ferromagnetic material. In the case of capacitive scale features can be defined by markings having particular capacitive properties.

The features can take the form of lines, dots or other configurations which can be read by a readhead. Preferred configurations for one-dimensional scales can comprise lines extending across the entire width of a track in a dimension perpendicular to the measuring dimension.

As will be understood, the readhead will comprise at least one detector for sensing the series of position features. The readhead can comprise at least one EMR sensitive detector. The at least one EMR sensitive detector can be an optical EMR sensitive detector. As will be understood, this can include detectors suitable for sensing electromagnetic radiation (EMR) in the infrared to ultraviolet range. For instance, the detector could be a visible EMR sensitive detector. The readhead could comprise a plurality of detector elements. For instance the readhead could comprise an array of detector elements. The array could be 1-dimensional or 2-dimensional.

The readhead can comprise at least one EMR source for illuminating the scale. The at least one EMR source can be an optical source. As will be understood, this can include sources suitable for emitting electromagnetic radiation (EMR) in the infrared to ultraviolet range. For instance, the source could be a visible EMR source. For example, the source could be a light emitting diode (LED).

As will be understood, at least some of the steps of the method of the invention can be performed by a device, e.g. a processor device, separate to the readhead. Preferably, the readhead is configured to calculate the extrapolated position information from at least one previous reading of the scale. Preferably the readhead is also configured to compare the extrapolated position with a position calculated from a reading of the scale to determine any discrepancy between them. Preferably the readhead is further configured to use the extrapolated position if there is a discrepancy. Furthermore, preferably the readhead is configured to maintain a record of any discrepancies.

According to a second aspect of the invention there is provided a readhead for reading a scale having features defining position information configured to perform the above described method.

According to a third aspect of the invention there is provided an encoder apparatus comprising a scale having features defining position information and a readhead for reading the scale, in which the apparatus is configured to: calculate extrapolated position information for subsequent use from at least one previous reading of the scale; compare an extrapolated position with a position calculated from a reading of the scale to determine any discrepancy between them; use the extrapolated position if there is a discrepancy; and maintain a record of any discrepancies.

As will be understood, the apparatus can comprise a processor device separate to the readhead. In which case the processor device can be configured to perform any of the steps of calculating extrapolated position information from at least one previous reading of the scale; comparing an extrapolated position with a position calculated from a reading of the scale to determine any discrepancy between them; use the extrapolated position if there is a discrepancy; and maintain a record of any discrepancies. Preferably, the readhead is configured to calculate extrapolated position information from at least one previous reading of the scale. Preferably it is also configured to compare an extrapolated position with a position calculated from a reading of the scale to determine any discrepancy between them. Preferably the readhead is further configured to use the extrapolated position if there is a discrepancy. Furthermore, preferably the readhead is configured to maintain a record of any discrepancies.

An embodiment of the invention will now be described, by way of example only, with reference to the accompanying drawings, in which:

FIG. 11A is a schematic plan view of the scale shown in FIG. 1;

FIG. 11B is a schematic illustration of the output from the sensor of the readhead shown in FIGS. 1 and 2; and FIG. 11C is a schematic illustration of a codeword extracted from the image of the scale.

Figure 1:
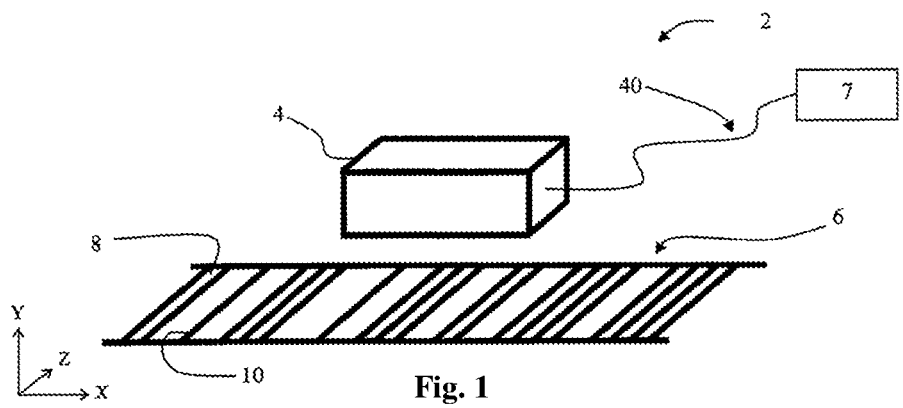
FIG. 1 shows a schematic perspective view of a metrological device according to the present invention.

Referring to FIG. 1 there is shown an encoder apparatus 2 comprising a readhead 4, scale 6 and controller 7. The readhead 4 and scale 6 are mounted to first and second objects respectively (not shown) which are moveable relative to each other. The velocity of relative movement can vary, but in the described embodiment the readhead 4 and scale 6 have a known maximum relative acceleration.

In the embodiment described, the scale 6 is a linear scale. However, it will be understood that the scale 6 could be a non-linear scale, such as a rotary scale. Furthermore, the scale 6 enables measurement in a single dimension only. However, it will be understood that this need not be the case, and for example the scale could enable measurement in two dimensions.

In the described embodiment, the scale 6 is an absolute scale and comprises a series of reflective 8 and non-reflective 10 lines arranged to encode unique position data along its length. As will be understood, the data can be in the form of, for instance, a pseudorandom sequence or discrete codewords.

The width of the lines depends on the required positional resolution and is typically in the range of 1 μm to 100 μm, and more typically in the range of 5 μm to 50 μm. In the described embodiment, the width of the lines is in the order of 15 μm. The reflective 8 and non-reflective 10 lines are generally arranged in an alternate manner at a predetermined period. However, select non-reflective lines 10 are missing from the scale 6 so as to encode absolute position data in the scale 6. For instance, the presence of a non-reflective line can be used to represent a "1" bit and the absence of a non-reflective line can represent a "0" bit.

Figure 2A:
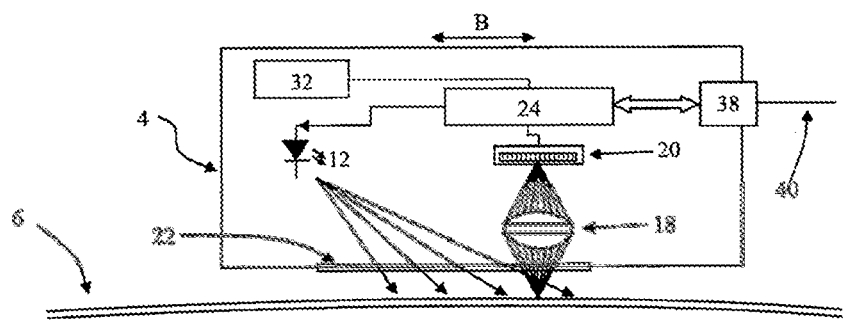
FIG. 2A is a schematic block diagram of the various optical and electronic components of the readhead according to a first embodiment.

As illustrated in FIG. 2A the readhead 4 comprises a Light Emitting Diode ("LED") 12, an optical element 18, a Complementary Metal-Oxide-Semiconductor ("CMOS") image sensor 20 and a window 22. The readhead may also include an analogue-to-digital converter to digitize the image data from the image sensor. Optionally, the analogue-to-digital conversion could be performed within the image sensor or the CPU. Light emitted from the LED 12 passes through the window 22 and falls on the scale 6. The scale 6 reflects the light back through the window 22 which passes through the lens 18 which in turn images the scale onto the image sensor 20 using the reflected light. Accordingly, the image sensor 20 detects an image of a part of the scale 6. The image sensor 20 comprises a single row of 256 elongate pixels whose lengths extend parallel to the lengths of the reflective 8 and non-reflective lines 10 on the scale. The embodiment shown is of the reflective type, but as will be understood, the invention can be used with transmissive type encoder apparatus (in which the light is transmitted through the scale rather than being reflected from it).

The readhead 4 also comprises a CPU 24, a memory device 32 in the form of Electrically Erasable Programmable Read-Only Memory (EEPROM) or Flash memory and an interface 38.

The LED 12 is connected to the CPU 24 so that the LED 12 can be operated on demand by the CPU 24. The image sensor 20 is connected to the CPU 24 such that the CPU 24 can receive an image of the intensity of light falling across the image sensor 20. The image sensor 20 is also directly connected to the CPU 24 so that the image sensor 20 can be operated to take a snapshot of intensity falling across it on demand by the CPU 24. The CPU 24 is connected to the memory 32 so that it can store and retrieve data for use in its processing. The interface 38 is connected to the CPU 24 so that the CPU 24 can receive demands from and output results to an external device such as a controller 7 (shown in FIG. 1) via line 40. The line 40 also comprises power lines via which the readhead 4 is powered.

Figure 2B:
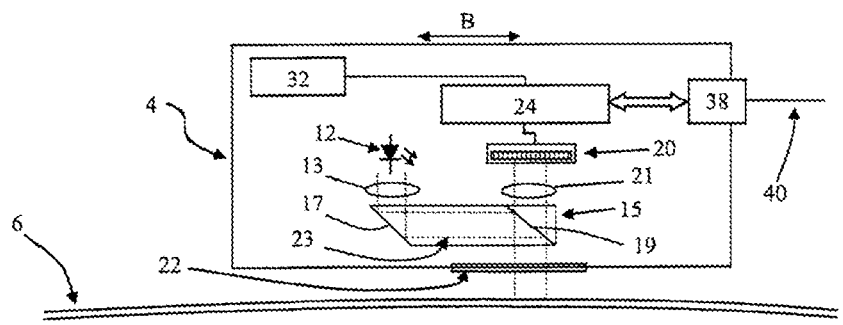
FIG. 2B is a schematic block diagram of the various optical and electronic components of the readhead according to a second embodiment.

The readhead illustrated in FIG. 2B is substantially the same as that illustrated in 2A and like parts share like reference numerals. However, the optical arrangement of the embodiment shown in FIG. 2B is slightly different. In this embodiment, the readhead 4 comprises a collimating lens 13, a beam splitter assembly 15 having a reflecting face 17 and a beam splitting face 19, and an imaging lens 21. The collimating lens 13 collimates light emitted from the LED 12 into a beam 23 which is then reflected by the splitter assembly's reflecting face 17 toward the beam splitting face 19. The beam splitting face 19 reflects the beam 23 toward the scale 6 via window 22, which then reflects the light back through the window 22 toward beam splitting face 19 which allows the reflected light to pass straight through it. The reflected light then passes through the imaging lens 21 which forms an image of the scale 6 onto the CMOS image sensor 20.

Referring to FIGS. 11A, 11B, and 11C, there is shown respectively: a schematic illustration of an example view of a section of the scale 6 showing the reflective 8 and non-reflective 10 lines as would be seen by the readhead's 4 image sensor 20 and having a fundamental period, i.e. scale period, "p"; the output 50 of the sensor imaging that section; and the binary value of a whole codeword contained within the imaged section. As shown in FIG. 11A, some of the non-reflective 10 lines have been omitted to define discrete codewords encoding absolute position data. For instance, the lines contained within dashed box 11 define one unique 16-bit codeword. "1" bits are defined by the presence of a non-reflective line 10 and "0" bits are defined by the absence of a non-reflective line 8. FIG. 11B is an illustration of the intensity variation across an image obtained by the image sensor 20. The CPU 24 can analyse the output and apply an intensity threshold $A_t$ at the points where it expects to see a reflective line. The CPU 24 interprets those points where the intensity is less than the threshold $A_t$ as a "1" and those points where the intensity is greater than the threshold $A_t$ as a "0". FIG. 11C illustrates the codeword extracted by the CPU 24 applying this algorithm to the output shown in FIG. 11B.

As will be understood, absolute position data could be encoded in the scale 6 by missing reflective lines 8, as well as, or instead of, missing non-reflective lines 10. Furthermore, absolute position data could be embedded in the scale 6 without the addition or removal of reflective 8 or non-reflective lines 10. For instance, the width of lines, the distance between them or their colour could be varied in order to embed the absolute position data in the scale 6. Furthermore, rather than the scale defining absolute position by the unique combinations of features taken along the scale's measuring length, the scale could have features defining absolute position by the unique combination of features taken along the width of the scale. For instance, the scale could comprise a plurality of "barcodes" the length of which extend across the scale, e.g. substantially perpendicular to the scale's measuring length. Optionally, the scale could comprise a plurality of tracks, in which at least one, optionally at least two and possibly all of these tracks could comprise a plurality of regularly spaced features (i.e. the tracks could essentially comprise incremental scale features of different fundamental frequencies) in which the scale period of the tracks differ from each other such that the combination of features across the scale's width is unique at any one point along the scale's measuring length.

As will also be understood, the invention could also be used with incremental scales. In this case, if desired, reference marks could be provided either adjacent, or embedded within, the incremental scale track.

Further still, the scale could comprise an absolute track comprising features defining absolute position information and an incremental track comprising regularly spaced features. In this case, the phase information could be determined from the incremental track, rather than the absolute track as in the embodiment described below.

A series of groups of markings can be used to encode a series of unique binary codewords along the scale length defining unique, i.e. absolute, position information, whilst still having sufficient information in order to enable phase information to be extracted from the series of markings to enable fine position information to be determined (e.g. position information with a resolution finer than the period of the scale markings). Accordingly, in such systems, the position information can be made up from a coarse absolute position (determined from the codeword extracted from the image) as well as a fine position (determined by looking at the phase offset of the substantially periodic markings). Further details of such a so-called hybrid incremental and absolute scale is described in International Patent Application no. PCT/GB2002/001629 (publication no. WO 2002/084223), the content of which is incorporated in this specification by this reference.

Figure 3:
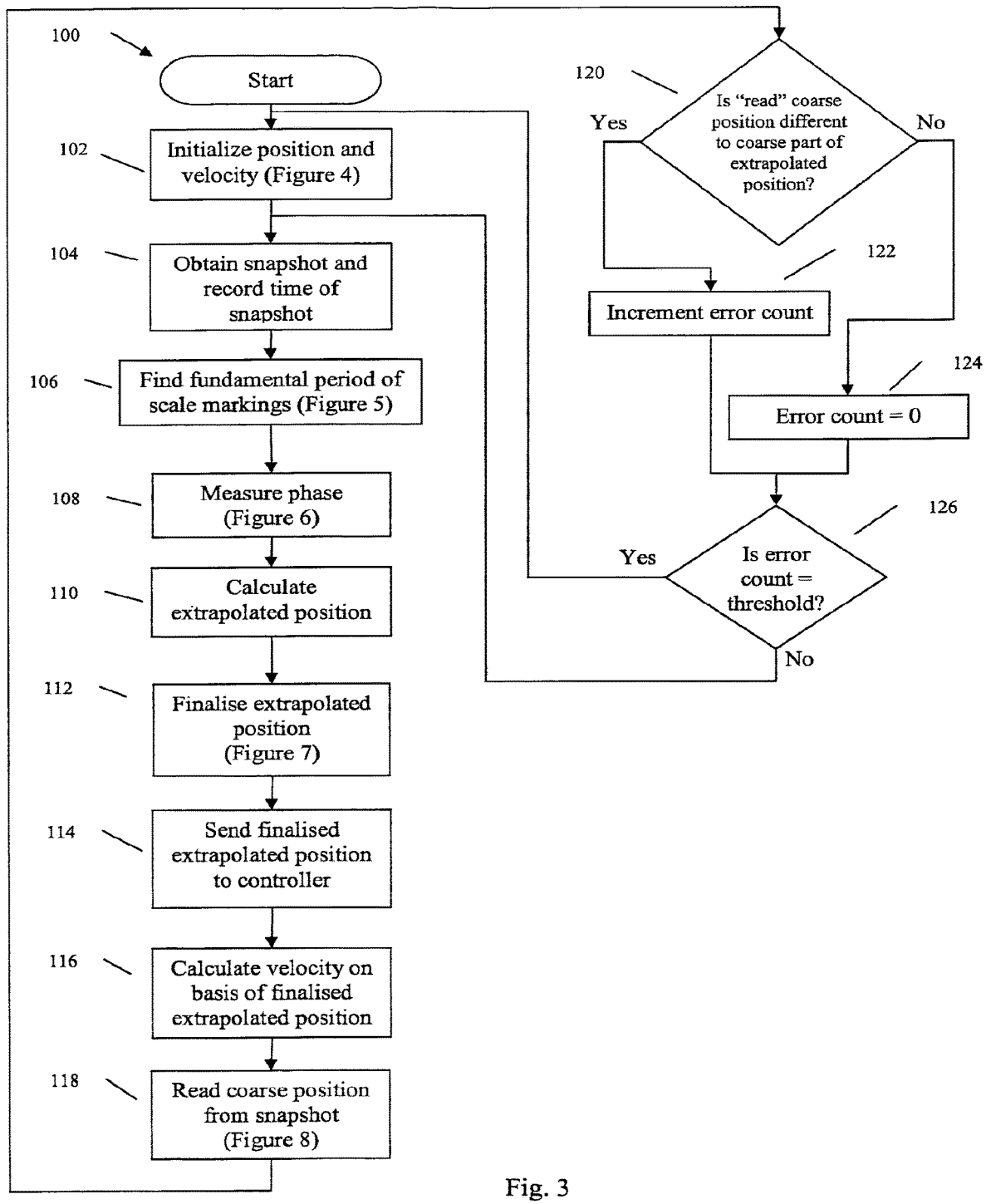
FIG. 3 is a flow chart illustrating the high-level operation of the readhead shown in FIG. 1.
Figure 4:
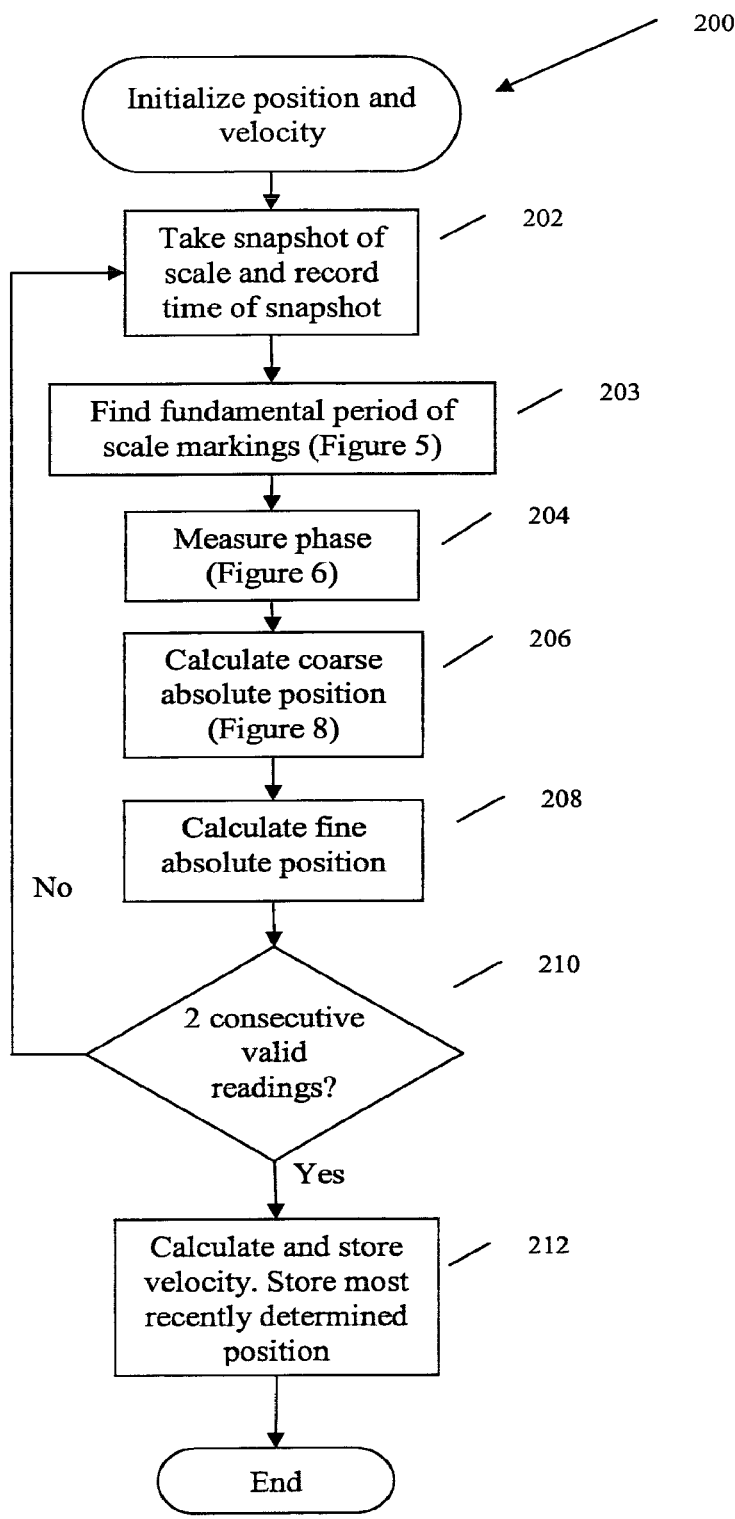
FIG. 4 is a flow chart illustrating the method of initializing position and velocity variables.

The method of operation 100 of the apparatus 2 will now be described with reference to FIG. 3. The method begins when the readhead 4 is powered up. The first step 102 involves determining the relative position and velocity of the readhead 4 and scale 6. In summary, this involves obtaining two readings of the scale at a known time difference and calculating the velocity based on the distance travelled in that time difference. The process for this step 102 will be described in more detail now in connection with FIG. 4.

The method of initializing the position and velocity of readhead 4 and scale 6 begins at step 202 by the readhead 4 obtaining a snapshot of the scale 6 and recording the time at which it obtained the snapshot. This is effected by the CPU 24 sending a signal to the LED 12 so as to cause the LED 12 to temporarily emit light. The CPU 24 also causes the image sensor 20 to simultaneously sense and register the intensity of the pattern of light falling across it. FIG. 11A is a schematic illustration of an example pattern of light falling on the image sensor 20. In this embodiment, the pattern of light is an image of the scale 6 at the instant in time the LED 12 was emitting. As can be seen, the image comprises a plurality of dark lines 10 and light lines 8 which correspond to non-reflective 10 and reflective 8 lines on the scale. As would be understood, the actual image of the scale 6 obtained by the image sensor 20 would unlikely be as sharp as that shown by the schematic illustration of FIG. 11A.

The output of the image sensor 20 is a signal representative of the image falling on it. FIG. 11B illustrates an example of the signal 50 output by the image sensor 20.

At step 203, the CPU 24 finds the fundamental period of the signal 50 output by the image sensor 42 and hence the fundamental period of the scale markings as imaged, the method for which will be described in more detail below with reference to FIG. 5.

At step 204, the relative phase offset between the scale markings and the centre line of the image sensor 20 is determined, the process for which is explained in more detail below with reference to FIG. 6. In summary the relative phase offset can be determined by calculating the phase between the wave described by the signal 50 output by the image sensor 20, and a reference SINE wave 52 having the same fundamental period as the wave described by the signal 50 output by the image sensor 20 (the reference SINE wave having a predetermined position relative to the image sensor such as the point 54 at which the SINE wave 52 crosses the zero point from negative to positive being at the centre relative to output of the image sensor 20). As will be explained in more detail below, the calculation of the phase offset can involve the comparison of the output signal 50 with a reference COSINE wave (not shown) as well as with the SINE wave 52.

Figure 8:
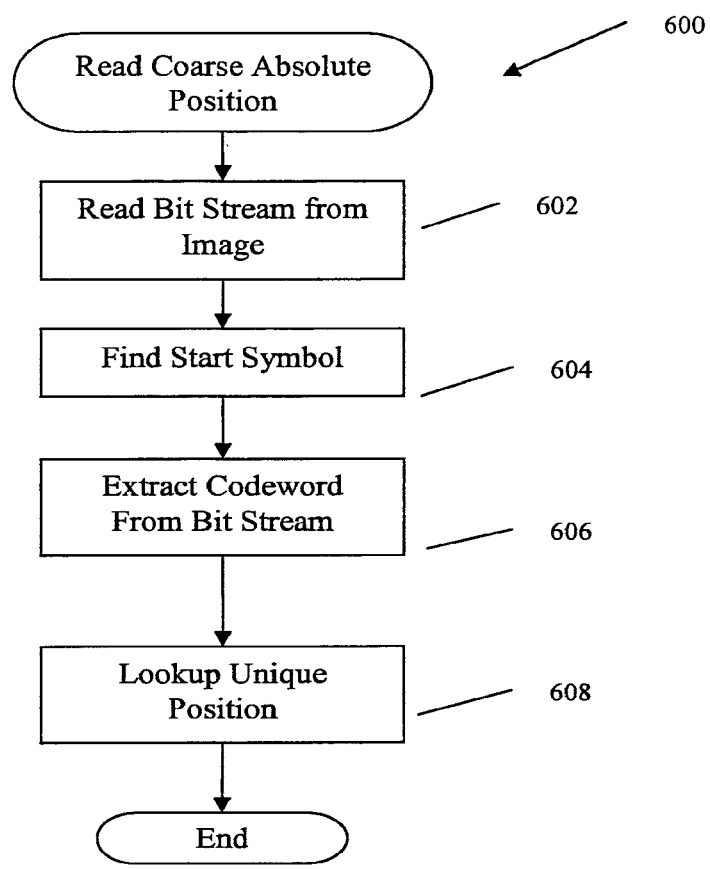
FIG. 8 is a flow chart illustrating the method of determining the coarse absolute position of the readhead relative to the scale.

Once the phase offset has been determined, the coarse absolute relative position of the readhead 4 and scale 6 is determined at step 206, the process for which is described in more detail below with reference to FIG. 8. The fine absolute relative position between the readhead 4 and scale 6 is then determined at step 208, by combining the coarse absolute position with the calculated phase offset, as described in more detail below.

At step 210, it is determined if two consecutive valid readings have been obtained. If not, then steps 202 to 208 are repeated until two consecutive valid readings have been obtained. It is common to include redundant information in the scale code to facilitate error detection and correction of the image data. Determining whether a reading is valid or not can comprise measuring the error rate (i.e. the amount of error correction which has to be performed) when decoding the scale code in the image. Optionally determining whether a reading is valid or not could comprise assessing the image intensity, or the amplitude of the fundamental period (the calculation of which is described below) of the image.

Once two consecutive valid readings have been obtained, the velocity is then calculated at step 212, based on the distance between the two most recent consecutive valid readings and the time between which they were taken. The determined velocity and the most recent position reading are then stored for future reference as described more detail below.

Figure 5:
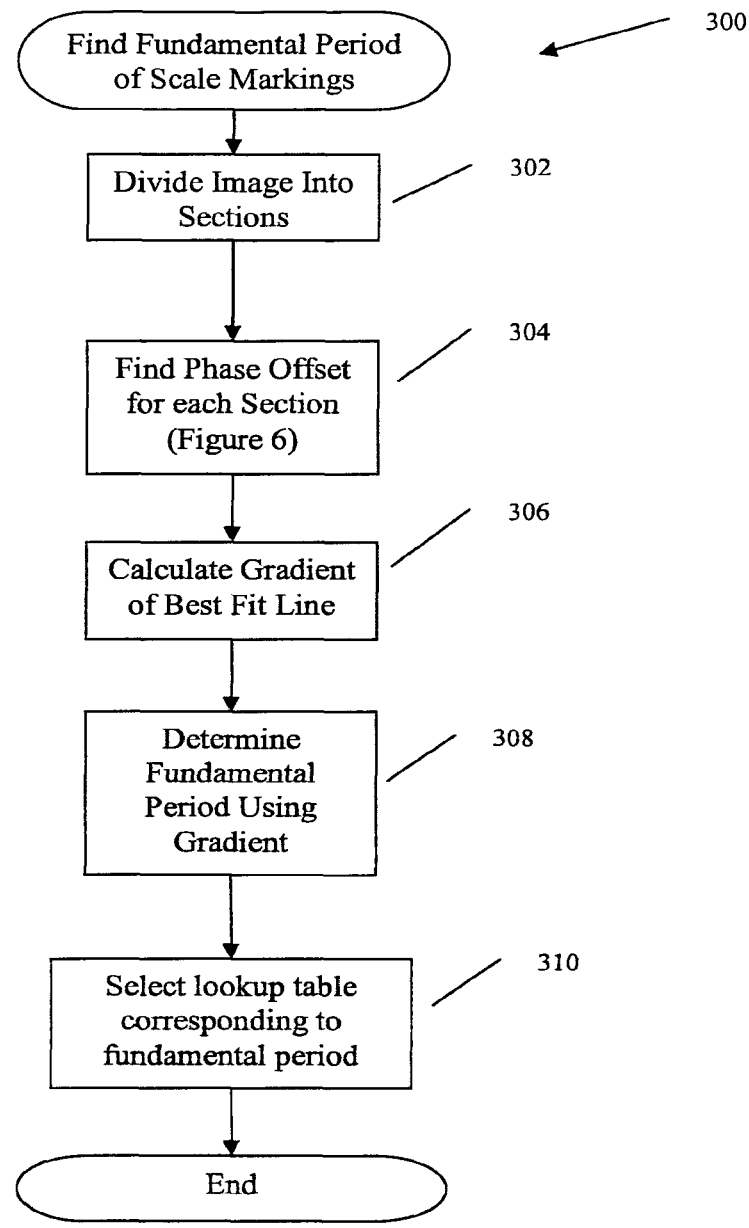
FIG. 5 is a flow chart illustrating the method of determining the fundamental period of the scale markings of the scale.

Referring now to FIG. 5, the process 300 for determining the fundamental period of the scale as imaged by the image sensor 20 begins at step 302 by dividing the image of the scale into a plurality of sections. In order to aid explanation of this process, reference is made to FIG. 9A which illustrates an example wave 142 representative of the intensity of an image detected by the image sensor 20. For the sake of clarity, the image is of a part of a scale having alternating reflective and non-reflective lines, with no lines missing. Furthermore, in practice, the apparatus will be configured such that there will likely be more lines per segment than is shown in order to reduce the effect of dirt on the scale and or missing/additional lines in the determination of the fundamental period of the scale. Further still, the waves are shown as analogue waves, although in the embodiment described the waves will be represented by digital sampled data.

The wave 142 representative of the image has been divided into six equal sized sections, three on either side of the centre line of the image sensor 20 (the centre line extending parallel to the length of the reflective 8 and non-reflective 10 lines on the scale 6). At step 304, the phase between one of the sections of the wave 142 and a corresponding section of the reference SINE wave 144 having a predetermined period (and having a predetermined position relative to the image sensor such that the midpoint of its positive gradient is at the centre of the image sensor) is determined.

Figure 6:
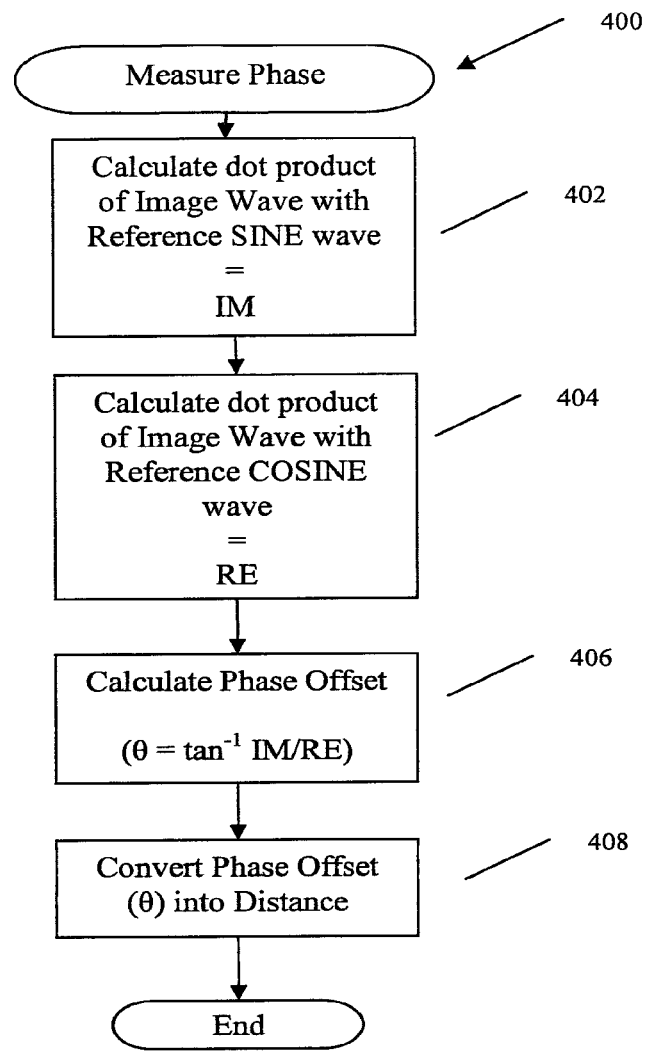
FIG. 6 is a flow chart illustrating the method of determining the phase offset of the readhead relative to the scale markings of the scale.

The phase for each section can be calculated using the process 400 illustrated in FIG. 6. This process 400 involves at step 402 calculating the dot product of one of the sections of the wave 142 with the corresponding section of a reference SINE wave 144 to obtain the "imaginary" component (IM). At step 404, the dot product of the same section of the wave 142 with a corresponding section of a reference COSINE wave 146, is then calculated to obtain the "real" component (RE). At step 406, the inverse TAN of the imaginary component divided by the real component is calculated to obtain a value (θ) that is directly proportional to an angular phase offset. The angular phase offset is then calculated at step 408 from the value determined in step 406. This process is repeated for each of the sections of the wave 142.

Figures 9A, 9B:
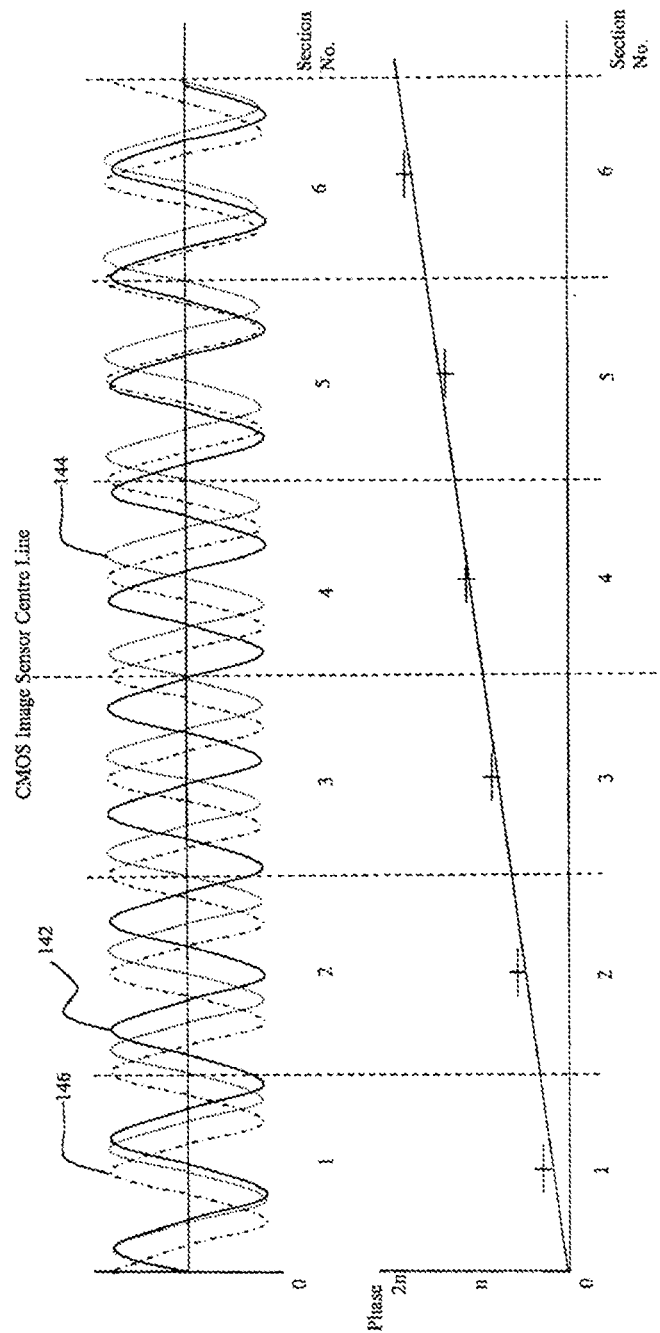
FIGS. 9A and 9B are graphs illustrating the determination of the fundamental period of the scale markings of the scale shown in FIG. 1 for a first position.

As can be seen in the example shown in FIG. 9A, the wave 142 representative of the image in section 1 is only slightly out of phase with the reference SINE wave 144. The phase between the wave 142 representative of the image and the reference wave 144 progressively increases for each of the sections until section 6 in which the wave 142 is almost 360 degrees, or 2Π radians out of phase, with the reference SINE wave 144. At step 306 the phase offset for each chunk is then plotted on a graph as illustrated in FIG. 9B, and the gradient of the best-fit line through all of the points is calculated. The gradient of the best-fit line is directly proportional to the difference between the period of the reference SINE wave 144, and the wave 142 representative of the image. Accordingly, at step 308, the fundamental period of the wave 142, and hence the fundamental period of the scale markings, can be determined based on that difference. As will be understood, when the period of the wave 142 is the same as the period of the reference SINE 144 and COSINE 146 waves, then the gradient of the best-fit line will be zero.

Figures 10A, 10B:
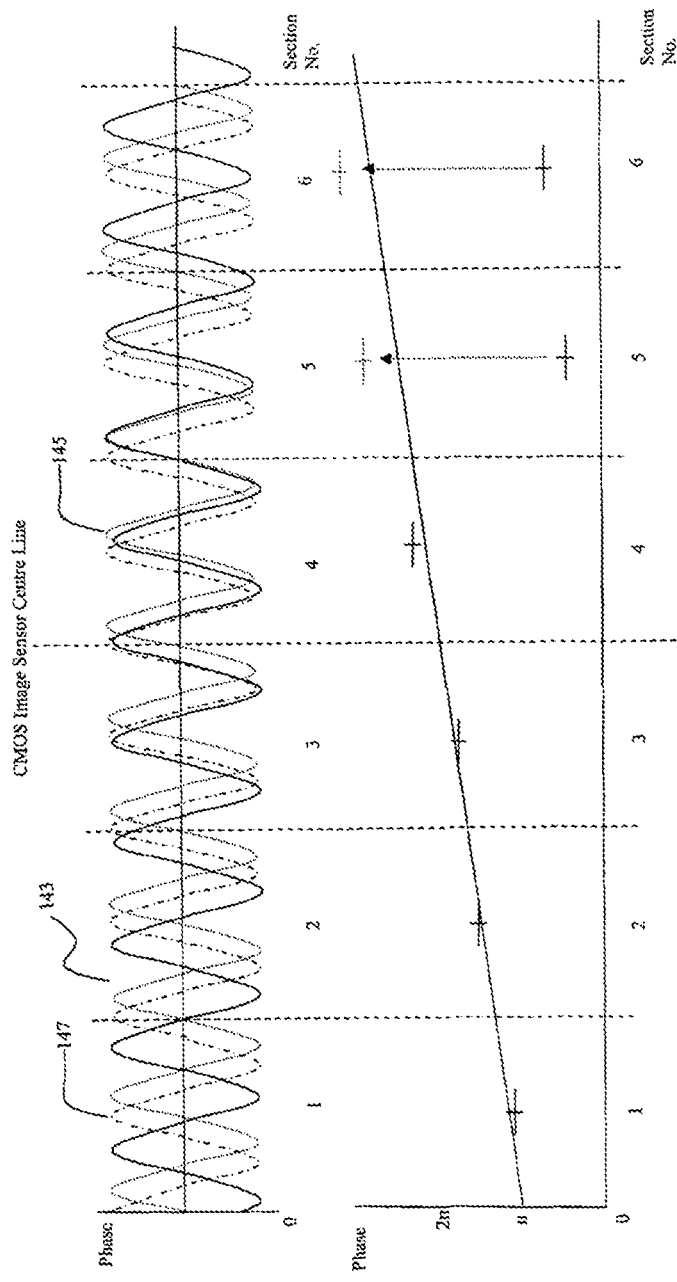
FIGS. 10A and 10B are graphs illustrating the determination of the fundamental period of the scale markings of the scale shown in FIG. 1 for a second position.

In the example described above in connection with FIG. 9, the snapshot of the scale was taken such that the first section of the example wave 142 was only slightly out of phase with the reference SINE wave 144. Accordingly, the phase difference between the reference wave and the reference SINE wave 144 increased progressively for each section. However, as illustrated in FIG. 10A, it might be that the snapshot of the scale is taken at a point at which the first section of the wave 143 is substantially out of phase with the reference SINE 145 wave. Accordingly, at some point there will likely be a jump in the phase offset between adjacent sections. In this example, the phase offset jump occurs between sections four and five (from a phase offset of close to 2Π in section four, to a phase offset of close to zero in section five). In this case, a best-fit line of the phase offset values for each section will not give a gradient which is directly proportional to the difference between the period of the reference SINE wave 145, and the wave 143 representative of the image. Therefore, step 306 of the method illustrated in FIG. 5 includes removing any phase offset jumps of more than Π between adjacent sections. This is achieved by adding or subtracting integer multiples of 2Π to the calculated phase offset of a section, so as to always give a change in phase between adjacent sections of less than Π, as illustrated in FIG. 10B. Once the jumps have been removed, the best-fit line is then determined and the fundamental period is obtained in the same way as described above with reference to FIG. 10.

At step 310, a lookup table corresponding to the fundamental period determined in the previous step 308 is selected. The selected lookup table contains values representative of SINE and COSINE waves having the same period as the determined fundamental period and is used in measuring the phase offset (i.e. steps 108 and 204). The lookup tables may be generated in advance, for instance on start up of the readhead or they could be pre-stored in the memory 32.

The process 400 for finding the phase offset as illustrated in FIG. 6, is also used in measuring phase offset of the analogue signal 50 output by the image sensor relative to the centre line of the image sensor (i.e. step 204 of FIG. 5). In this case however, the dot product is calculated for the entire digitised version of the analogue signal 50 output by the image sensor with a reference SINE wave 52 (step 402) and COSINE wave (not shown) (step 404) having the period determined at step 203 of FIG. 4. The inverse tan of the imaginary component divided by the real components is then calculated to obtain the angular phase offset (θ) at step 406 which is then converted into an offset distance used in the determination of the combined absolute position (i.e. in step 208 of FIG. 4).

Returning back to FIG. 3, the process 100 continues at step 104 at which point a further snapshot of the scale is obtained and the time at which it was taken is recorded. Step 104 can be performed on receipt of a position request from the controller 7. However, if a position request has not been received from the controller 7 within a predetermined maximum time limit then the readhead 4 can initiate step 104. This ensures that the relative velocity is regularly updated and therefore an accurate extrapolated position can be determined when the controller does eventually request position information.

At step 106, the fundamental period of the scale markings as imaged is determined. This is done using the process 300 already described above in connection with FIG. 5. The phase offset of the scale markings as imaged is then measured at step 108, using the process 400 already described above in connection with FIG. 6. Again the dot product is calculated for the entire digitised version of the analogue signal 50 output by the image sensor.

At step 110, an extrapolated position is calculated. This is done by multiplying the relative velocity by the time elapsed since the previous position was determined. This gives the distance moved since the previous position was determined. Adding this distance to the previous position gives the extrapolated position. However, this calculation assumes that the velocity has remained constant. Any acceleration will result in a small error in the extrapolated position.

Figure 7:
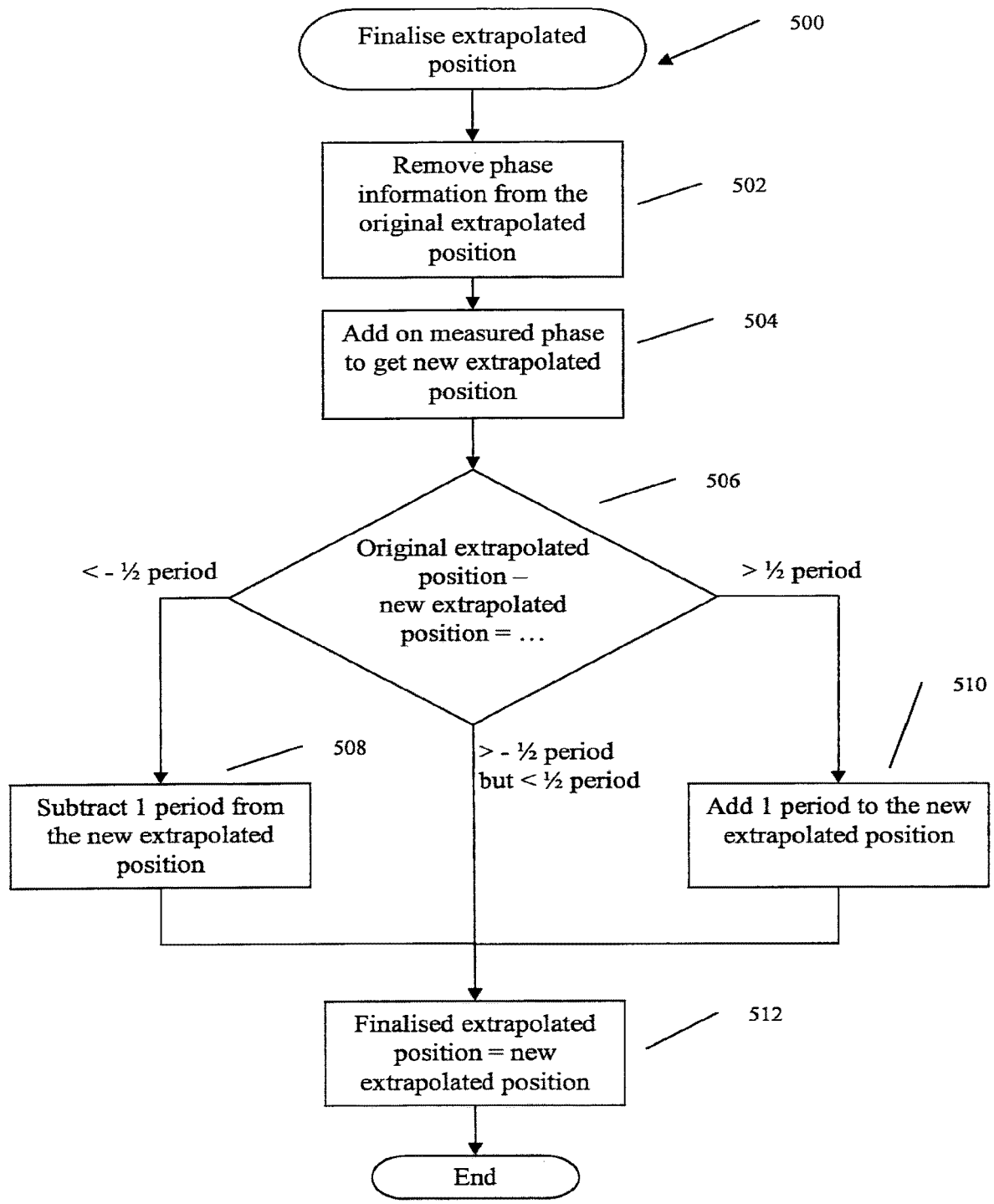
FIG. 7 is a flow chart illustrating the method of correcting the extrapolated position.

Accordingly, the extrapolated position is corrected at step 112 to remove any such error (providing that its magnitude is less than half of one scale period), the process for which is described in more detail below in connection with FIG. 7. The requirement that the error is always less than one half of a scale period puts an upper limit on the acceleration of the readhead 4 relative to the scale 6. For a typical system with 30 μm period scale where the readhead takes a snapshot every 100 μs then this limit is around 1500 m/s$^2$ (150 g), which is much higher than that required for any metrological application.

If at step 104 the snapshot was requested in response to the controller 7 requesting position information, the finalised extrapolated position is transmitted to the controller 7 at step 114.

The method continues at step 116 in which the current velocity is updated and calculated on the basis of the current finalised extrapolated position and the previously known position and the respective times at which the snapshots from which those positions were calculated were taken.

At step 118, the actual coarse position is read from the snapshot obtained at step 104, the process 600 for which is explained in more detail below in connection with FIG. 8.

At step 120, the coarse position that was read from the snapshot at step 118 is compared to the coarse part of the finalised extrapolated position determined at step 114. This initially involves removing the phase measured at step 108 from the finalised extrapolated position to get the coarse part of the finalised extrapolated position. If the read coarse position differs from the coarse part of the extrapolated position, then an error has occurred—either the read position and/or the extrapolated position is incorrect. An encoder apparatus operating in accordance with the present invention assumes that the extrapolated coarse position is less likely to be incorrect than the read coarse position and so rather than immediately issuing a warning or taking corrective action, an error counter is incremented at step 122. Only when, at step 126, there have been a sufficient number of successive differences (e.g. when the error count equals a predetermined threshold level) between the read coarse position and extrapolated coarse position does an encoder apparatus according to the invention take action. In this case, at least four successive differences are allowed before corrective action takes place. In this case corrective action includes returning the process back to step 102 at which the velocity and position are re-initialized. Of course, other action could be taken including issuing an error and/or warning signal to, for instance the controller 7, which can then take action in response thereto. For instance, the controller 7 may in response to receiving such an error stop the machine (or a part of the machine) on which the readhead 4 and scale 6 are located.

If the read coarse position and extrapolated coarse position are the same, then the error count is at step 124 set to zero.

As described earlier, other methods can be used in the handling of discrepancies between the extrapolated position and actual reading. In particular, a determination of whether the discrepancy is due to an error in the extrapolated position or the reading of the scale (and hence whether, for instance to signal an error and/or take corrective action or not) can be based on the magnitude of the discrepancy. In particular, as described earlier, depending on the coding scheme used, it can be possible to assume that a small discrepancy is due to a failure in the extrapolation process whereas a large discrepancy is due to a failure in the reading of the scale.

The process 500 for finalising the extrapolated position will now be described with reference to FIG. 7. The method begins at step 502 at which point the phase information is removed from the original extrapolated position (determined at step 110). In effect, this can be achieved by rounding down the original extrapolated position to the nearest whole coarse absolute position (i.e. to the nearest whole scale period). At step 504, the phase offset measured at step 108 is added onto the rounded down extrapolated position, to get a "new extrapolated position". Due to constraints on the acceleration of the parts on which the readhead 4 and scale 6 are mounted, it is known that the new extrapolated position must be within ½ a period of the original extrapolated position. Accordingly, at step 506, a check is done to establish whether this is the case or not. This involves subtracting the new extrapolated position from the original extrapolated position. If the difference between them is less than −½ period, then at step 508 one period is subtracted from the new extrapolated position. If the difference between them is greater than ½ period then at step 510 one period is added to the new extrapolated position. If the difference between them is between −½ period and ½ period, then the new extrapolated position is not altered. Finally, at step 512, the finalised extrapolated position is set as being the amended (or unaltered) extrapolated position.

The process 600 for reading the coarse absolute position will now be described with reference to FIG. 8. The process begins at step 602 with the CPU 24 reading the bit stream from the image of the scale, i.e. from the signal 50 output from the image sensor 20. The fundamental period of the scale markings, and the phase offset relative to the centre line of the image sensor 20 have already been determined at steps 106 and 108. Accordingly, the CPU 24 knows at which points in the signal 50 the amplitude represents a reflective 8 or non-reflective 10 line on the scale 6. As illustrated in FIGS. 11A, 11B, and 11C, at each of those points, the CPU 24 interprets a low amplitude (e.g. an amplitude below a threshold $A_t$) in the signal 50 as a "1" bit and a high amplitude (e.g. an amplitude above a threshold $A_t$) as a "0" bit.

The bits of absolute data on the scale 6 are grouped into codewords (for instance codeword 11). Each codeword defines a unique absolute position along the scale 6. As will be understood start symbols at the beginning of each codeword can be used which serve to mark the start of each codeword. For instance, in this embodiment, the start word can comprise the bit sequence "1101". If start symbols are used, the choice of start symbols is constrained as the chosen sequence for the start symbol must not occur within any of the codewords otherwise part of the codeword could be misidentified as a start symbol. Furthermore, no codeword must end with the beginning of the start symbol or vice versa as this could result in the position of the codeword being misinterpreted by a few bits.

The image sensor window is wide enough to see at least one complete codeword regardless of the readhead 4 and scale's 6 relative position at the time a snapshot is taken.

At step 604, the start symbol is located and at step 606 the bits following the start symbol are read. The position along the scale corresponding to the codeword is determined. This may be done by the use of a lookup table stored in the memory 32 which is used to decode the codeword. Accordingly, at step 608 the codeword read from the image is compared with codewords stored in the lookup table. The matching position in the lookup table gives the coarse absolute position of the codeword relative to the scale datum. The coarse absolute position of the readhead relative to the scale datum is then calculated by subtracting the position of the start symbol relative to the readhead found in step 604 from the coarse position of the codeword found in step 608. Of course, error detection and correction techniques can be employed in order to overcome the presence of erroneous bits, such as the techniques disclosed in International Patent Application no. PCT/GB2002/001629. Furthermore, other techniques can be used to encode and determine the coarse absolute position of the readhead 4 relative to the scale 6. For instance, the reflective 8 and non-reflective 10 lines on the scale 6 could encode a pseudorandom absolute code, wherein every combination of a predetermined number of bits uniquely identifies an absolute relative position between the readhead 4 and the scale 6.

Accordingly, a method of operating an encoder is described that outputs position information that is at least partly extrapolated, but performs appropriate checks to ensure that the extrapolated position agrees with full readings taken from the scale. If there is a discrepancy then the encoder will still output the extrapolated position but will keep a record of the discrepancy. If the position reading was incorrect (as can be caused by random noise or for example the head passing over a piece of dirt on the scale) then on the next check the extrapolated and measured positions will agree and the encoder will continue to operate normally. If on the other hand the position reading was correct and the extrapolated position incorrect then for all subsequent checks the extrapolated position will continue to slowly deviate from the correct readings. After a small number of checks the readhead can identify this situation and take appropriate action before the output position is significantly wrong.

The method described checks each extrapolated position with a full reading of the scale. Nevertheless, it will be understood that this need not necessarily be the case, and for instance, only some of the extrapolated positions might be checked. For example, such checks might be performed at frequent intervals, which might be time-based or for instance based on the number of positions calculated (e.g. at least every tenth, at least every fifth, or at least every other extrapolated position might be checked). Furthermore, the regularity at which such checks are carried out could be adaptive, and could change for various reasons, such as for instance the number and/or extent of previous discrepancies determined.

The invention claimed is:

1. A method of operating a position encoder apparatus, comprising a scale having features defining position information, a readhead for reading the scale, and a processing device, the method comprising in any suitable order:
   using position data acquired from at least one previous reading of the scale to calculate extrapolated position information by the processing device so as to form an extrapolated position;
   comparing the extrapolated position with a position obtained from a reading of the scale and determine any discrepancy between them by the processing device;
   always using the extrapolated position information whether or not there is a discrepancy between the extrapolated position and the position obtained from the reading of the scale by the processing device; and
   maintaining a record of any discrepancy by the processing device.

2. A method as claimed in claim 1, comprising monitoring the record for discrepancies indicative of a failure of the extrapolated position calculation.

3. A method as claimed in claim 2, in which monitoring comprises monitoring the number of discrepancies.

4. A method as claimed in claim 2, in which monitoring comprises monitoring the magnitude of the discrepancy.

5. A method as claimed in claim 2, further comprising performing an error routine in the event of discrepancies indicative of a failure of the extrapolated position.

6. A method as claimed in claim 5, in which performing an error routine comprises issuing an error signal.

7. A method as claimed in claim 1, in which calculating extrapolated position information comprises using i) a coarse position extrapolated from at least one previously determined absolute position and ii) fine pitch position information calculated from a current reading of the scale.

8. A method as claimed in claim 1, in which comparing comprises comparing a coarse extrapolated position with coarse position information read from the scale.

9. A method as claimed in claim 1, in which the scale comprises features defining a series of unique absolute positions.

10. A method as claimed in claim 9, in which the fine pitch position information is determined from the features defining the series of unique absolute positions.

11. A method as claimed in claim 1, comprising sending the extrapolated position to an external device.

12. A method as claimed in claim 1, comprising storing the extrapolated position for use in a subsequent extrapolation calculation.

13. A method as claimed in claim 1, in which each extrapolated position is compared with a position calculated from a reading of the scale to determine any discrepancy between them.

14. A readhead for reading a scale having features defining position information configured to perform the method of claim 1.

15. A position encoder apparatus, comprising a scale having features defining position information, a readhead for reading the scale, and a processing device, the apparatus being configured to:
   use position data acquired from at least one previous reading of the scale to calculate extrapolated position information by the processing device so as to form an extrapolated position;
   compare the extrapolated position with a position obtained from a reading of the scale and determine any discrepancy between them by the processing device;
   always use the extrapolated position whether or not there is a discrepancy between the extrapolated position and the position obtained from the reading of the scale by the processing device; and
   maintain a record of any discrepancies by the processing device.

* * * * *